(12) United States Patent
Brown et al.

(10) Patent No.: US 6,653,510 B1
(45) Date of Patent: Nov. 25, 2003

(54) PROCESS FOR THE ISOLATION OF POLYMER FRACTIONS

(75) Inventors: Beverley Anne Brown, Manchester (GB); Janos Veres, Manchester (GB); Joanne Victoria Allen, Warrington (GB); John Dylan Morgan, Manchester (GB); Stephen William Leeming, Manchester (GB)

(73) Assignee: Avecia Limited, Blackley (GB)

( * ) Notice: Subject to any disclaimer, the term of this patent is extended or adjusted under 35 U.S.C. 154(b) by 12 days.

(21) Appl. No.: 09/979,841
(22) PCT Filed: Jun. 14, 2000
(86) PCT No.: PCT/GB00/02310
§ 371 (c)(1),
(2), (4) Date: Nov. 28, 2001
(87) PCT Pub. No.: WO00/78843
PCT Pub. Date: Dec. 28, 2000

(30) Foreign Application Priority Data

Jun. 18, 1999 (GB) ................................................ 9914163
Jun. 18, 1999 (GB) ................................................ 9914164

(51) Int. Cl.$^7$ ............................................. C07C 211/00
(52) U.S. Cl. ....................... 564/431; 585/443; 564/433; 430/58.7
(58) Field of Search ........................ 430/58.7; 585/443; 564/431, 433

(56) References Cited

U.S. PATENT DOCUMENTS

| 4,714,779 A | 12/1987 | Turner |
| 4,937,165 A | 6/1990 | Ong |

FOREIGN PATENT DOCUMENTS

| WO | WO 99/32537 | 7/1999 |

*Primary Examiner*—Samuel Barts
(74) *Attorney, Agent, or Firm*—Pillsbury Winthrop LLP

(57) ABSTRACT

The invention relates to a process for isolating, from a polymer comprising repeating units which are individually of Formula X

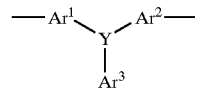

in which Y is P or N, $Ar^1$ & $Ar^2$ are bivalent aromatic groups, $Ar^3$ is a monovalent aromatic group, and the units of Formula X may be the same or different, a molecular weight fraction which is especially suitable for use as a charge transport material.

25 Claims, No Drawings

PROCESS FOR THE ISOLATION OF POLYMER FRACTIONS

This application is the National Phase of International Application PCT/GB00/02310 filed Jun. 14, 2000 which designated the U.S. and that International Application was published under PCT Article 21(2) in English.

The present invention relates to certain polymeric materials, and compositions containing them which are charge transport materials. The invention also relates to processes for making these polymers and their use in devices such as electroreprographic devices and electroluminescent devices.

Polymers of the invention may be used in the field of electroreprography. Electroreprography is any process in which an image is reproduced by means of electricity and incident radiation, usually electromagnetic radiation, more usually visible light. Electroreprography includes the technology of electrophotography which encompasses photocopying and laser printing technologies. Typically, in both a photocopier and a laser printer, a photo-conductive member is first charged in the dark (e.g. by applying a high voltage via a Corona discharge). Then a latent electrostatic image in charge is produced by partial exposure of the charged photo-conductive member (e.g. a drum or belt) to radiation (e.g. light). The radiation neutralises the charge in the exposed regions. The light source can either be reflected light from an illuminated image (photocopying) or from a laser which scans the photo-conductive member usually under instruction from a computer (laser printing). Once a latent image has been produced in charge, it is developed with toner, the toner is transferred onto a substrate (e.g. paper) and then fixed thereto (e.g. by heat) so that a visible image is obtained.

The photo-conductive member typically comprises a photo-conductor (e.g. an organic photo-conductor ["OPC"]) which must perform two different functions: generate a charge on exposure to the incident radiation; and transport the photo-generated charge to the surface. The unexposed regions of the photo-conductive member will retain their charge and form the latent image. It is usual to use different materials for each of these two processes and develop materials which are separately optimised for their ability to generate photo-induced charge (charge generating materials or "CGMs") or their ability to transport charge (charge transport materials or "CTMs"). The photo-conductor can be constructed as a single layer or from a plurality of layers, for example from at least one charge generating layer ("CGL") comprising the CGM and at least one separate charge transport layer ("CTL") comprising the CTM.

An ideal photoconductor would be one where the material charges rapidly to a high value in the dark, retains the charge in the dark (i.e. exhibits no dark decay) and shows rapid total discharge on exposure to low-intensity illumination. The time taken for the charge-discharge cycle of a photo-conductor limits the maximum speed at which the latent image can be generated. Photo-conductive materials with improved electrical properties may allow faster printing and copying and/or higher quality copies and/or longer component life.

The applicant has discovered means to improve the charge transport properties of certain polymers based on triaryl amine repeat unit(s).

PCT/GB98/03685 is a co-pending patent application which describes novel CTM polymers of repeat unit of Formula D

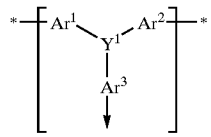

where $Y^1$ is N, P, S, As and/or Se and $Ar^1$, $Ar^2$ and $Ar^3$ are aromatic groups. These polymers are prepared by the addition of an end capping reagent to control the molecular weight of the final polymer and hence its desirable properties as a CTM.

The disclosure of this co-pending application is incorporated herein by reference; its definitions and description should be used in connection with the present invention except as modified herein.

The procedure of the co-pending application produces attractive charge transfer agents. However we have now found that they may be further improved and indeed similar-materials which are not end capped may be improved by isolating an appropriate molecular weight fraction from them. We have found that medium molecular weight. polymers are generally superior to lower and higher molecular weight polymers derived from the same starting materials; lower molecular weight polymers are less effective and crystallise more readily and are thus not durable; higher molecular weight polymers are durable but less effective. By means of this invention a fraction may be selected which is of good performance and is sufficiently durable to cover the required life of components of electroreprographic devices whilst optimising its charge transport effectiveness.

According to one aspect of the present invention there is provided a process which comprises isolating, from a polymer comprising repeating units which are individually of Formula X

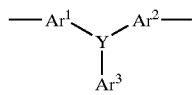

in which
Y is P or N,
$Ar^1$ & $Ar^2$ are bivalent aromatic groups,
$Ar^3$ is a monovalent aromatic group, and
the units of Formula X may be the same or different,
a molecular weight fraction which is a charge transport material.

According to a another aspect of the present invention there is provided a process in which an improved charge transport material is produced by isolating, from a first charge transport material which is a polymer comprising repeating units which are individually of Formula X

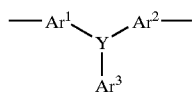

in which
Y, $Ar^1$, $Ar^2$ and $Ar^3$ are as previously defined; and
the units X may be the same or different,
a molecular weight fraction of improved charge transport properties.

$Ar^1$ $Ar^2$ and $Ar^3$ preferably comprise benzenoid rings which are optionally fused with other, preferably benzenoid, rings and/or substituted.

The polymer may be a block copolymer comprising such repeat units.

Trivalent repeat units of Formula D may be included to permit a degree of chain branching if desired.

The molecular weight fraction produced by the process according to the present invention may be of Formula 1:

$$AX_mB \qquad \text{Formula 1}$$

in which
- each X is a unit of Formula X as defined above and may be the same or different;
- A and B are chain terminating groups, for example, hydrogen, chlorine, bromine or iodine, or other leaving groups used in a polymerisation process by which the polymer is made, or end capping groups, and
- m is the average number of X units per molecule of the fraction.

The value of m is suitably 4 to 50, preferably 4 to 30, more preferably 4 to 25 for example 4 to 15 and especially 5 to 13 or 6 to 14. Generally it is desired that m is at least 5 in all of the above ranges.

The polydispersity of the fraction is suitably 1.1 to 4, preferably 1.1 to 3 and more preferably 1.2 to 2.5. Suitably the fraction is substantially free from molecules having 3 or fewer or 50 or more repeat units.

The aryl groups may be mono- or poly-cyclic and the rings are preferably benzene rings substituted with, for example, one or more $C_{1-40}$-alkyl groups in order to increase their solubility in for example tetrahydrofuran (THF) for processing purposes. They may have fused ring groups, naphthyl groups or covalently linked benzene rings for example biphenyl residues but are preferably benzene rings which are each substituted with alkyl groups providing a total of one to eight aliphatic carbon atoms per benzene ring.

Preferably the groups A and B are inert to coupling with further molecules of the polymer so as to reduce the likelihood of further growth of molecules to undesired sizes. Thus it is preferred that they should not be halide atoms.

Molecular weight fractions produced by the present invention may be isolated from polymers prepared without the addition of a separate end capping reagent to control the molecular weight of the polymer.

Isolation of the molecular weight fraction may be by filtration technologies, chromatographic techniques, osmotic methods, and/or solid extraction using a suitable solvent, for example Soxhlet extraction.

In a preferred form of the invention (which may be used together with one or more of the above techniques) the process comprises a step of partially precipitating from a solution of the polymer in a suitable solvent, a molecular weight fraction thereof. It may be separated by dissolving the polymer in the solvent, precipitating a least soluble (highest molecular weight) fraction and then recovering a fraction of greater solubility having good CTM properties, for example in electrophotographic applications, from the remaining solution. The least soluble fraction may be usable as a CTM in non-electrophotographic applications. Examples of suitable solvents are dichloro- and trichloro-ethane, dichloro- and trichloro-ethylene, dichlorobenzene, toluene, dioxane and, more preferably, THF. It will be appreciated that it is not necessary to use any other isolation procedure in conjunction with this preferred form of the invention.

If there are undesired low molecular weight molecules present, they may be allowed to remain in the solution when a desired fraction is recovered. The fractions may be recovered by (a) cooling the solution and collecting successive fractions in the course of cooling, or
(b) evaporating solvent from a solution of the polymer and collecting successive fractions or
(c) more conveniently, differential precipitation, that is, by the addition of a precipitant to a solution of the polymer and collecting successive fractions at increasing concentrations of the precipitant, in which a precipitant is suitably a liquid which is miscible with the solvent but in which the polymer is sparingly soluble.

The precipitant may be selected from n-octane, heptane, n-hexane, cyclohexane, methylpentane, n-butanol, n-propanol, 2-propanol, ethanol, methanol, acetone, mixed alkanes such as petroleum ether (pet ether) with boiling range 60–80° C., methyl-t-butyl ether (MTBE), high boiling mixed alkanes such as those available under the trade name Isopar (e.g. Isopar G with a boiling point of about 160° C.); and/or mixtures thereof. The chosen precipitant has a boiling point (at ambient conditions) preferably from about 50° C. to about 200° C., more preferably from about 60° C. to about 170° C. It is preferably a lower alcohol, for example a $C_{1-6}$-alkanol, such as ethanol or propanol or, more preferably, methanol, or a lower alkane or cycloalkane, preferably a $C_{4-10}$-alkane or cycloalkane, or acetone. An especially preferred precipitant is methanol.

The molecular weight fraction collected by the isolating means preferably has an average number of repeat units ('m' number) of from about 4 to about 15, more preferably from about 5 to about 13.

The isolated molecular weight fraction preferably has a much narrower molecular weight distribution than the crude polymer.

According to a further aspect of the present invention the polymerisation may be performed in the presence of a controlling means to control molecular weight of the polymeric material during polymerisation (and before isolation) to provide a polymer suitable for use as a charge transport material, more preferably which is electroreprographically effective, most preferably with an average number of repeat units 'm' of between about 4 and about 25. The means for controlling MW may be any of those described in co-pending British patent Application No 9914164.1 (the priority of which is claimed for this application) and/or those described in co-pending application PCT/GB98/03685.

However, even if the crude polymer is already effective for use as a CTM after polymerisation and without isolation, because a means to control molecular weight has been used to prepare the polymer, the isolation means according to the aforementioned aspects of the present invention may be used to isolate a fraction having further improved properties as a charge transport material. Alternatively, the isolation means may be used to convert crude polymer which is not especially fit for this purpose into an effective charge transport material. Thus, the combination of the two methods of control of molecular weight during polymerisation and isolation of molecular weight fraction from the crude polymer after polymerisation can be used flexibly to achieve cost effective production of polymer with the required performance as a charge transport material. The polymeric materials of the present invention are preferably obtained by polymerisation controlled by addition of at least one end capping reagent in an amount sufficient to reduce substantially further growth of the polymer chain. The end capped polymers of the invention can be produced more cheaply and with a better control over their resultant properties (such as their molecular weight and polydispersity) due to the end capping. Furthermore the chemical nature of the end cap can be selected to control aspects of the polymerisation and hence properties of the resultant polymer. For example carrier mobility, polymer compatibility, electronic configuration [e.g. frontier orbital (FO) energy levels] and/or solubility may be affected by substitution (if used) and/or molecular weight (e.g. mobility can be shown to increase with polymer molecular weight).

For optimum electroreprographic performance preferably the polymers of the invention are substantially free of chlorine, more preferably substantially free of chloro, bromo and iodo, containing species.

Polymers of the present invention preferably have a weight average molecular weight ($M_w$) from about 1000 to about 13000 daltons.

In Formulae 2 and 3 hereinafter a suitable terminal group such as hydrogen or another substituent which is inert to coupling under the conditions of polymerisation, eg an akyl or aryl group, can be selected to control aspects of the polymerisation and $Ar^1$, $Ar^2$ and $Ar^3$ are each an optionally substituted aromatic group which may be a mononuclear aromatic group or a polynuclear aromatic group. A mononuclear aromatic group has only one aromatic ring, for example phenyl or phenylene. A polynuclear aromatic group has two or more aromatic rings which may be fused (for example napthyl or naphthylene), individually covalently linked (for example biphenyl) and/or a combination of both fused and individually linked aromatic rings. Preferably each $Ar^1$, $Ar^2$ and $Ar^3$ is an aromatic group which is substantially conjugated over substantially the whole group.

Polymers of the present invention may be made by a polymerisation process which is controlled to limit further growth of the polymer chain. If the end capping reagent is generated in situ in excess (e.g. at the step when it is desired to terminate polymerisation) further growth of the polymer chain (and/or polymer network if the is polymer is branched and/or cross-linked) can be substantially inhibited (e.g. substantially quenched). The end capper adds terminal group(s) to the polymer chain which are substantially incapable under the conditions of polymerisation of undergoing coupling (e.g. with other polymer precursor and/or other parts on the polymer chain). The terminal group(s) end cap the polymer chain and act to substantially reduce the possibility of (preferably stop) further polymerisation by blocking sites at which the polymer chain could otherwise grow under the conditions of the polymerisation. Preferably in the polymers of the present invention from about 60% to substantially all of the polymerisation sites are blocked by at least one terminal substituent. More preferably (in one option) substantially all such sites are blocked. In another more preferable option from about 60% to about 90% of these sites are blocked.

Optional features of polymer fractions of the present invention, which may further distinguish them from known polymers, are that they can, if desired: comprise terminal group(s) other than a group selected from H, halo, hydroxy, glycidyl ether, acrylate ester, methacrylate ester, ethenyl, ethynyl, vinylbenzoxyl, maleimide, nadimide, triflurovinyl ether, a cyclobutene, a group forming part of a cyclobutene group, and trialkylsiloxy; and/or be other than copolymer(s) which consist of triarylamine repeat unit(s) and $C_{4-7}$alicyclic repeat unit(s) optionally containing heteroatom(s); and/or be substantially undoped; and/or substantially polydisperse and/or other than of formula:

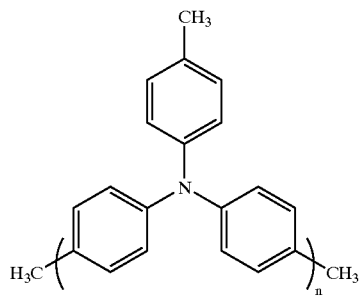

wherein n is from 7 to 11.

Polymer fractions of the invention preferably comprise at least 4, and more preferably at least 6, repeat units of Formulae X or 1 or Formulae 2 or 3, hereinafter.

Preferred polymer fractions of the present invention comprise molecules represented by Formula 2:

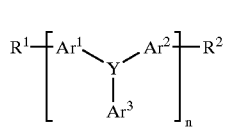

Formula 2 wherein
  $Ar^1$, $Ar^2$, $Ar^3$ & Y represent, independently in each case, those atom(s) and/or group(s) as described herein;
  n represents an integer from 3 to about 500;
  $R^1$ & $R^2$ represent, independently, a terminal group as described herein.

In Formulae X and/or 2, $Ar^1$, $Ar^2$, and $Ar^3$ are preferably, each independently, optionally substituted aromatic groups, more preferably having optionally substituted heterocyclic and/or benzenoid rings. Most preferably the optionally substituted aromatic groups $Ar^1$ and $Ar^2$ are, or form part of, bivalent $C_{6-40}$-hydrocarbyl groups, preferably phenylene and/or naphthylene groups. Any substituents are preferably $C_{1-15}$-alkyl groups.

Polymeric material of the present invention may comprise molecules represented by Formula 3

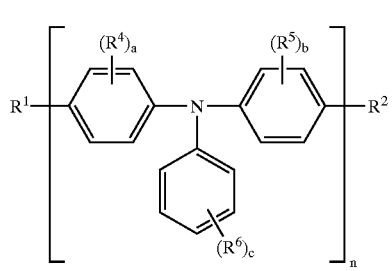

Formula 3 wherein
  $R^1$ & $R^2$ represent terminal groups which are unreactive groups, that is are substantially incapable of undergoing chain extension under the conditions of polymerisation;
  a & b represent, independently in each case, 0 or an integer from 1 to 4;
  c represents, independently in each case, 0 to 5;
  n represents an integer from 4 to about 200; and
  $R^4$, $R^5$ & $R^6$ represent, independently in each case, optionally substituted $C_{1-15}$alkyl groups and/or one or more other substituents.

The terminal groups (which may be attached to the repeat units of Formula X, denoted by A & B in Formula 1 and denoted by $R^1$ & $R^2$ in Formulae 2 and 3 are preferably unreactive groups, that is are substantially incapable of undergoing chain extension or cross-linking under the conditions of polymerisation. They are more preferably independently selected from hydrogen or $C_{1-40}$-hydrocarbyl groups, preferably selected from $C_{1-30}$-alkyl, $C_{6-36}$-aryl and $C_{7-36}$-aralkyl groups, any of which may optionally be substituted. Especially preferred terminal groups comprise $C_{6-36}$-aryl groups optionally substituted with at least one $C_{1-4}$-alkyl, $C_{1-4}$-alkoxy, or amino group (itself optionally N-substituted by at least one $C_{1-4}$-alkyl). In particular the terminal group may be selected from phenyl, optionally substituted with at least one methyl, 2-methylprop-2-yl, methoxy, ethoxy, trifluoromethyl and/or diethylamino group.

The novel polymer fractions of the present invention are of use as CTMs in electroreprographic devices. However such polymers may have many other uses which may rely on the same, similar and/or different properties to those required for electroreprography.

For example the polymers of the present invention may be generally relevant for use in (and/or in combination with) any application and/or device which requires the use of polymeric conductors, polymeric photo-conductors, organic photo-conductors (OPCs), electroluminescent (EL) materials, polymeric materials which exhibit substantial conjugation over the polymer and/or polymeric semiconductors. Preferred polymeric semiconductors have hole mobilities greater than 0.01 $cm^2$/volt.sec. This minimum mobility is either that of the pure polymeric material, or of an admixture of the polymeric material with one or more other polymeric or monomeric materials having different electrical and/or physical properties. Preferably the polymers of the present invention also exhibit some or all of the following other useful properties: high carrier mobility, compatibility with binders, improved solubility, high durability and/or high resistivity undoped.

The polymers of the invention may be used in at least one of the devices and/or for at least one of the applications described in co-pending PCT application GB98/03685.

Certain of these applications may require tuning of the properties of the polymers of the invention. For example polymeric CTMs of the invention when optimised for use with organic light emitting materials (OLEMs) preferably may have a higher molecular weight and/or different mobilities than are optimal for electroreprography.

Furthermore the compositions and/or specific polymers used for each application may be different. For example it is desirable that an electroreprographic polymeric CTM is compatible with the binder polymers (such as polycarbonates) used to make a CTL. By comparison a polymeric CTM for use in an OLEM may be formulated without many other (or even no other) ingredients to make a film of substantially pure CTM. Thus each of these CTM polymers may require different physical properties.

The invention is illustrated by the following Examples. Unless indicated to the contrary, or clearly different from the context, all references herein and in the following examples and experiments to percentages refer to the percentage by mass of ingredient to total mass of the composition to which the ingredient is to be added or of which it is a part.

The number average molecular weights ($M_n$) quoted in the Examples herein were determined by gel permeation chromatography (Waters 150CV) calibrated against polystyrene standards. Samples were run in tetrahydofuran (hereinafter "THF") using two "Polymer Labs. Mixed D" gel columns at a rate of 1 ml/min. A value for $M_n$ was determined from the GPC spectrum, and from the $M_n$ value, an approximate average degree of polymerisation (=m as defined herein) was calculated by subtracting the mass of the terminal groups and dividing by the molecular weight of the repeat unit.

The electrical properties given in the Examples herein were obtained in the following test methods.

Test Method—Time of Flight (TOF) Experiment to Measure Carrier Mobility

A number of electrophotographic photoreceptors were prepared as described below.

Preparation of Charge Generation Laver (CGL)

Titanyloxy phthalocyanine (TiOPc) type IV (15.0 g) was dispersed into a 5% w/w solution of polyvinyl butyral (PVB) in n-butyl acetate (75.0 g) using a high shear mixer. A further quantity of n-butyl acetate (20.0 g) was added to the dispersion to reduce its viscosity. The resulting slurry was charged to an Eiger Mini 50 Motormill (supplied by Eiger Torrance Ltd.) containing a charge (34 ml) of 0.6 to 0.8 mm zirconia beads. The mill was operated at 3,000 rpm for 50 minutes. PVB solution (25.0 g, 5% w/w in n-butyl acetate) was added to the millbase and milling was continued for a further 10 minutes. The millbase was discharged into a receiving vessel and PVB solution (61.5 g) was added to the mill and circulated for 5 minutes. The solution was then discharged into the millbase which was stirred throughout to prevent pigment agglomeration and n-butyl acetate (349.0 g) was flushed through the bead mill and out into the stirred dispersion to yield a CGL coating formulation of PVB (1.48%), TiOPc (2.75%) and n-butyl acetate (95.77%).

The dispersion was coated onto aluminised Melinex film using a K#2 bar and K Control coater model 202 (supplied by RK Print-Coat Industries Ltd.). The coating was dried for 5 minutes at 100° C. to produce a CGL which was approximately 0.4 µm thick.

Preparation of a Charge Transport Layer (CTL) of the Invention

A formulation comprising a CTM of the invention was prepared using an amount of a CTM and (optionally) another CTM as specified in the Examples. If not otherwise specified herein 0.5 g of CTM was used (equivalent to 25% CTM in the CTL) in the following preparation. The polymeric CTM and polycarbonate resin (1.5 g of the PCZ available commercially from Esprit Chemical Co. under the trade designation TS 2020) were dissolved in toluene (7.1 g). This solution was coated on top of the CGL made as described above, using a 150 µm wet film depositing bar and K Control coater. The coating was dried for 90 minutes at 100° C. to give a CTL which was approximately 25 µm thick.

Electroding

A semi-transparent metal electrode was applied to the top of a section of the film by vacuum deposition. The CTL thickness was measured using an Elcometer E 300 device. A small portion of the CGL and CTL (prepared as described above) close to the top electrode, was removed with a suitable solvent to reveal the bottom electrode. The electrodes were connected to a power supply and a digitising oscilloscope.

Hole Carrier Transit-time Measurement

The time of flight (TOF) technique is a transient photo-conductivity experiment well known to those skilled in the art. A field was applied across the sample via the electrodes and a sheet of charge carriers (holes) was photogenerated at one side of the film. The charge carriers drifted through the film under the influence of the field creating a current which was detected using a current amplifier connected to the oscilloscope. When the carriers reached the counter electrode, the current was observed to decrease and the transit-time across the film could thereby be determined from the transit waveform. The measurement was repeated with a range of different applied voltages.

Determination of Field Mobility ($\mu$)

The drift mobility of carriers ($\mu$) was calculated for each applied field (=V/L) using the equation:

$$\mu = L^2 V^{-1} t_{tr}^{-1},$$

where L is the device thickness, V is the applied voltage and $t_{tr}$ is the transit time. Mobility at a field strength of 160 kV/cm was determined by interpolation of the mobility vs F plot. A field strength of 160 kV/cm is typical of what may be present in a working photoreceptor. A high value of mobility is desirable because it indicates that the photoreceptor will discharge rapidly on exposure to light.

Test Method—Photoinduced Discharge (PIDC) Test for Photosensitivity of OPC Devices A number of electrophotographic photoreceptors were prepared as in the TOF technique described herein. A photoreceptor test piece of approximately 5×10 cm was cut out from the coated aluminised Melinex. The test piece was then fixed to a bare aluminium drum (used as the substrate for an OPC), 30 mm in diameter. Two small areas of coating were removed from the edge of the test piece using a suitable solvent. The test piece was then electrically connected to the drum using a suitable conductive paint. The drum was then mounted in a QEA PDT 2000 device (available commercially from Quality Engineering Associates Inc. Burlington Mass. 01803 USA) and was grounded via the contact in the QEA instrument. The QEA PDT 2000 was fitted with a 780 nm band pass filter. A track with a consistent −800 V charge of at least 10 mm length was selected using the charge scanner. Once the track had been selected the PIDC was measured in the known manner. The energy required to discharge the photoreceptor to ⅛th of its original potential i.e. from −800 V to −100 V ($E_{7/8}$) and the residual potential on the photoreceptor after the highest energy exposure (~3 $\mu Jcm^{-2}$) (Vr) were recorded. Low values for $E_{7/8}$ and $V_r$ are desirable in a photoreceptor as they indicate efficient discharge of the device on exposure to light.

Photoreceptors With CTMs of the Invention and Various CTL Binders

OPC devices can be prepared in a similar manner to the method described above using different CGLs, binders and/or additives in combination with other CTMs and CGMs, for example as described in co-pending application PCT/GB98/03685 (e.g. in the tables thereof).

In the following Examples, polymers having repeat units of the type represented by Formula X, in which $Ar^1$, $Ar^2$ and $Ar^3$ comprise benzene rings, are identified by the substituents on $Ar^3$ in each repeat unit (e.g. "3-methyl polymer" refers to a polymer having a N-(3-methylphenyl)-diphenyl-4,4'-yleneamine) repeat unit.

EXAMPLE 1

Part A

Preparation of '2,4-dimethyl' polymer by polymerising bis(N-chlorophenyl)-2,4-dimethylphenylamine without the use of endcapping reagent and no isolation.

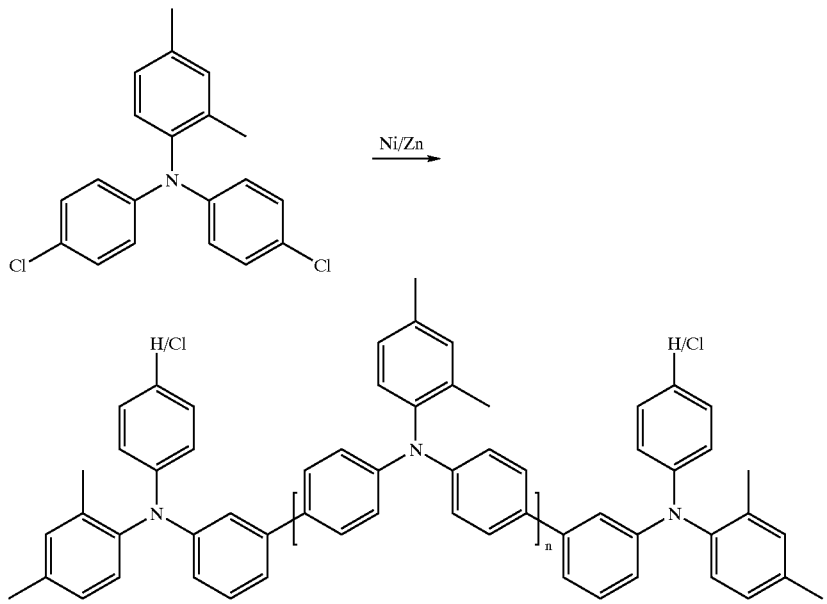

A reaction flask (500 mL, 5 neck) equipped with overhead stirrer, thermometer and nitrogen line was flame dried under nitrogen. Nickel(II) chloride (0.14 g, 1.05 mmol), zinc powder (8.9 g, 136.1 mmol), 2,2'-dipyridyl (0.25 g, 1.58 mmol), triphenylphosphine (2.76 g, 10.5 mmol) and N,N-dimethylacetamide (anhydrous, 100 mL) were charged to the reaction vessel. The mixture was stirred at room temperature for 1 hour after which time a deep red/brown solution was observed indicative of catalyst formation. The temperature was then raised to 80° C. and bis(4-chlorophenyl)-2,4-dimethylphenylamine (15.0 g, 43.8 mmol) was added to the reaction flask. Heating was continued at 80° C. for 6 hours, after which time the reaction was deemed complete. The reaction mixture was allowed to cool to room temperature and added to a stirring mixture of water (400 mL) and dichloromethane (400 mL). With stirring HCl (conc., 50 mL) was added dropwise to destroy the excess zinc. The resulting mixture effervesced. The organic extract was collected and the aqueous phase was further extracted with dichloromethane, with warming, to aid dissolution of some retained product. The dichloromethane phase was filtered, the organic extracts combined and concentrated under reduced pressure to yield a yellow gum. The resulting gum was dissolved in THF (400 mL) and precipitated from ethanol (600 mL). The resulting precipitate was collected by vacuum filtration. The solid was dissolved in fresh DCM (200 mL) and washed with $Na_2CO_3$ (1M, 200 mL). The organic extract was collected, concentrated under reduced pressure and purified by column chromatography (silica gel), eluting with a 750 mL mixture of dichloromethane and hexane (in a respective volume ratio of 3 to 1). Removal of the solvent under reduced pressure followed by precipitation from THF (200 mL) and methanol (600 mL) yielded the title polymer (Solid 1A) as an off-white solid (8.6 g), which was characterised as follows:

$M_n$=3,100 daltons; and m=11.5

The mobility of Solid 1A was measured as described in the Test Method herein and $\mu$=9.0×10$^{-6}$ cm$^2$V$^{-1}$s$^{-1}$ (@160 kV/cm).

Part B

Fractionation of '2,4-dimethyl' polymer from polymerisation of bis(N-chlorophenyl)-2,4-dimethylphenylamine without the use of endcapping reagent.

Solid 1A (from Part A) was fractionated to obtain material of lower molecular weight. Solid 1A (6.2 g) was dissolved in dichloromethane (50 mL) and hexane (65 mL) slowly added until a gum-like residue formed on the glassware. The liquor was decanted and concentrated under reduced pressure to yield a pale yellow solid. The resulting solid was dissolved in THF (50 mL) and precipitated from methanol (400 mL). The resulting precipitate was collected by vacuum filtration and dried under vacuum at 70° C., to yield off-white Solid 1B1 (4.9 g), which was characterised as follows:

$M_n$=2,900 daltons; and m=10.7

The mobility of Solid 1B1 was measured as described in the Test Method herein and $\mu$=1.9×10$^{-5}$ cm$^2$V$^{-1}$s$^{-1}$ (@160 kV/cm).

The gum-like residue was dried under reduced pressure to yield Solid 1B2 (1.03 g) and characterised as follows:

$M_n$=7,000 daltons; and m=25.8;

The mobility of Solid 1B2 could not be obtained by the Test Method herein, due to the insoluble nature of this material.

EXAMPLE 2

Polymer made without control of molecular weight until reaction completed after 68 hours. Preparation of '2,4-dimethyl' polymer by polymerising bis-(N-chlorophenyl)-2,4-dimethylphenylamine without the use of endcapping reagent

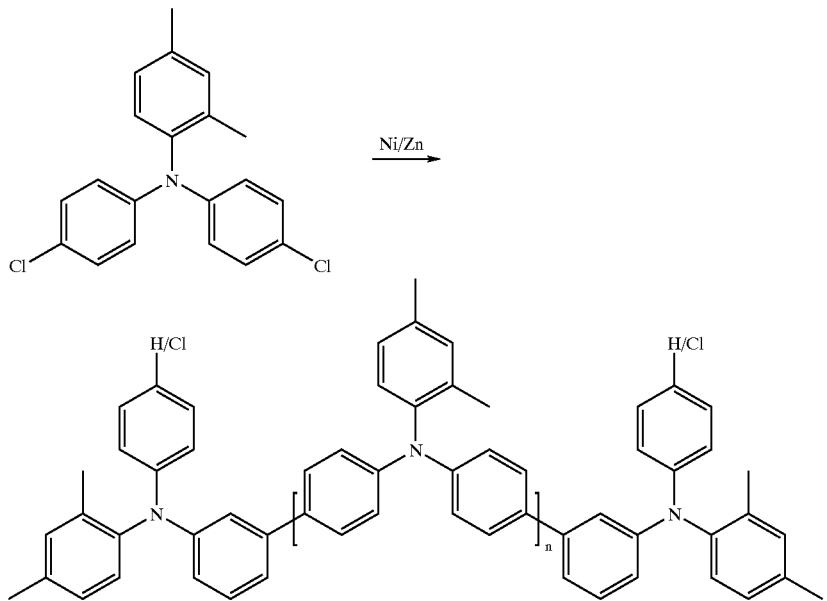

A reaction flask (250 mL, 5 neck) equipped with overhead stirrer, thermometer and nitrogen line was flame dried under nitrogen. Nickel(II) chloride (0.097 g, 0. 75 mmol), is zinc powder (5.9 g, 90.4 mmol), 2,2'-dipyridyl (0.18 g, 1.13 mmol), triphenylphosphine (3.93 g, 15 mmol) and N,N-dimethylacetamide (anhydrous, 75 mL) were charged to the reaction vessel. The mixture was stirred at room temperature for 30 minutes after which time a deep red/brown solution was observed indicative of catalyst formation. The temperature was then raised to 80° C. for 30 minutes then bis (4chlorophenyl)-2,4-dimethylphenylamine (10.0 g, 29.5 mmol) as a solution in toluene (25 mL) was added to the reaction flask. Heating was continued at 80° C. for 68 hours, after which time the reaction was deemed complete. The reaction mixture was allowed to cool to room temperature and HCl (conc., 30 mL) added dropwise to destroy the excess zinc. The resulting mixture effervesced. Dichloromethane (100 mL) and water (100 mL) were added to the mixture and the organic extract was collected. The organic extract was washed successively with water (3×50 mL), NaHCO$_3$ (saturated solution, 2×50 mL) and water (100 mL), then concentrated under reduced pressure to yield off-white Solid 2A. The aqueous phase showed the presence of higher molecular weight material which was insoluble in dichloromethane. Filtration of the aqueous phase afforded Solid 2B which was soluble in hot THF and hot toluene, characterised as follows:

Solid 2B: M$_n$=22,300 daltons and m=82.

Solid 2A was dissolved in THF (50 mL) and precipitated from methanol (700 mL). The resulting precipitate was collected by vacuum filtration and purified by column chromatography (silica gel), eluting with a 350 mL mixture of dichloromethane and hexane (in a respective volume ratio of 3 to 1). Removal of the solvent under reduced pressure followed by precipitation from THF (50 mL) and methanol (600 mL) yielded the title polymer (Solid 2C) as an off-white solid (4.0 g), which was characterised as follows:

Solid 2C: M$_n$=5,400 daltons and m=20;

The mobility (i) of Solid 2C was measured as described in the Test Method herein and i=5.0×10$^{-7}$ cm$^2$v$^{-1}$s$^{-1}$ (@ 160 kV/cm).

The mobility of Solid 2B could not be obtained by the Test Method herein, due to the insoluble nature of this material.

TABLE 1

| Example 1 | m | M$_n$ (daltons) | $\mu$ (cm$^2$V$^{-1}$s$^{-1}$) @ 160kV/cm |
|---|---|---|---|
| Solid 1A | 11.5 | 3,100 | 9.0 × 10$^{-6}$ |
| Solid 1B1 | 10.7 | 2,900 | 1.9 × 10$^{-5}$ |
| Solid 1B2 | 25.8 | 7,000 | NM |

TABLE 2

| Example 2 | m | M$_n$ (daltons) | $\mu$ (cm$^2$V$^{-1}$s$^{-1}$) @ 160kV/cm |
|---|---|---|---|
| Solid 2B | 82 | 22,300 | NM |
| Solid 2C | 20 | 5,400 | 5.0 × 10$^{-7}$ |

NM = not measurable.

EXAMPLE 3

Preparation of the "2,4-dimethyl polymer" by polymerising the bis(N-4-chlorophenyl)-2,4-dimethylphenylamine using 1-chloro-3-methylbenzene as the end capping reagent.

A reaction vessel (1 liter, 5-neck) was equipped with an overhead stirrer, a nitrogen line and was flame dried under nitrogen. Nickel(II) chloride (0.5 g), zinc powder (30.4 g), 2,2'-dipyridyl (0.9 g), triphenylphosphine (9.9 g) and anhydrous N,N-dimethylacetamide (300 ml) were charged to the reaction vessel. The mixture was stirred at room temperature for 30 mins and a deep red/brown solution was observed which is characteristic of the catalyst. The catalyst solution was warmed to 80° C. and then the bis(N-4-chlorophenyl)-2,4-dimethylphenylamine (50.0 g) was added to the catalyst solution. The 1-chloro-3-methylbenzene (9.2 g) was added over 30 mins via a syringe pump. The reaction was maintained at temperature and stirred for 4.5 hours, after which time more of the 1-chloro-3-methylbenzene (9.2 g) was added. The resulting mixture was stirred for a further 14 hours, to ensure the polymer was completely end capped.

The reaction mixture was allowed to cool to room temperature and DCM (100 mL) was added. This mixture was poured into stirring water (300 mL) and hydrochloric acid (10 M, 100 mL) was added dropwise. The resulting mixture effervesced. The organic layer was removed and washed sequentially with sodium hydrogen carbonate solution and several times with distilled water. The organic layer was concentrated under reduced pressure to yield a yellow oil. The resulting oil was dissolved in THF (75 mL) and poured into stirring methanol (1.5 liter) to form a yellow solid (53.8 g). This solid was dissolved in 200 mL of a mixture of DCM and hexane (in a respective ratio of 1 to 1) and purified by column chromatography (silica gel), eluting with 2.7 liter of a mixture of DCM and hexane (in a respective volume ratio of 1 to 1). The excess solvents were removed, the resulting solid dissolved in THF (75 mL) and the solution was poured into methanol (1 liter). The precipitate was collected and dried under vacuum at 70° C., to give yellow flakes (44.5 g). This solid was dissolved in 200 mL of a mixture of DCM and hexane (in a respective ratio of 5 to 4) and purified by column chromatography (silica gel), eluting with 2 liter of a mixture of DCM and hexane (in a respective volume ratio of 5 to 4). The excess solvents were removed, the resulting solid dissolved in THF (75 mL) and the solution was poured into methanol (1 liter). The resulting precipitate was collected and dried under vacuum at 70° C., to give yellow flakes (41.5 g). This solid was dissolved in 200 ml of a mixture of DCM and hexane (in a respective ratio of 10 to 7) and purified by column chromatography (silica gel), eluting with 1.7 liter of a mixture of DCM and hexane (in a respective volume ratio of 10 to 7). The excess solvents were removed, the resulting solid dissolved in THF (75 mL) and the solution was poured into methanol (1 liter). The resulting precipitate was collected and dried under vacuum at 70° C., to give, as yellow flakes, the title polymer (40.5 g), which was characterised as follows:

M$_n$=1400 daltons and m=5.

EXAMPLE 4

Selective Precipitation of the Example 3 to isolate fractions of different molecular weights.

Fraction 4.1

The product (20 g) from Example 3, was dissolved in THF (400 mL). Methanol (150 mL) was added to form a precipitate/oil and the liquors decanted off. The resultant oil (fraction 1) was solidified by the addition of methanol (100 mL), the precipitate was collected and dried under vacuum at 70° C. to yield a dark yellow solid (3.9 g). The solid was dissolved in THF (10 mL) and poured into methanol (100 mL). The resulting precipitate was collected by vacuum filtration and dried under vacuum at 70° C. to give, as a dark yellow solid (3.7 g), fraction 4.1, which was characterised as follows:

Fraction 4.1: M$_n$=3900 daltons and m=14.

Fraction 4.2

Methanol (75 mL) was added to the remaining liquors decanted from fraction 4.1 above, to form an oil/precipitate. The liquors were decanted off. The resultant oil (fraction 4.2) was solidified by the addition of methanol (100 mL). The dark yellow solid (4.4 g) was collected, dissolved in THF (10 mL) and poured into methanol (100 mL). The resulting precipitate was collected by vacuum filtration and dried under vacuum at 70° C. to give, as a yellow solid (4.2 g), fraction 4.2, which was characterised as follows:

Fraction 4.2: M$_n$=3000 daltons and m=10.

Fraction 4.3

Methanol (100 mL) was added to the remaining liquors decanted from fraction 4.2 above, to form an oil/precipitate. The liquors were decanted off. The resultant oil (fraction 4.3) was solidified by the addition of methanol (100 mL). The yellow solid (3.3 9) was collected, dissolved in THF (10 mL) and poured into methanol (100 mL). The resulting precipitate was collected by vacuum filtration and dried under vacuum at 70° C. to give, as a yellow solid (3.2 g), fraction 4.3, which was characterised as follows:

Fraction 4.3: $M_n$=2000 daltons and m=7.

The electrical performance of different fractions is shown in Table 3.

TABLE 3

| Example | m | $M_n$ (daltons) | $\mu$ (cm$^2$V$^{-1}$s$^{-1}$) @ 160kV/cm |
|---|---|---|---|
| 3 | 5 | 1,400 | 1.22 × 10$^{-5}$ |
| Fraction 4.1 | 14 | 3,900 | 8.42 × 10$^{-5}$ |
| Fraction 4.2 | 10 | 3,000 | 4.5 × 10$^{-5}$ |
| Fraction 4.3 | 7 | 2,000 | 1.4 × 10$^{-5}$ |

Example 4.1 to 4.3 illustrates that successive molecular weight fractions isolated from a 25 crude polymeric CTM exhibit higher mobility than the crude polymer (Example 3). Thus polymers isolated by selective precipitation exhibit improved properties as CTM.

EXAMPLE 5

Part A

Preparation of '2,4-Dimethyl' Polymer by Polymerising bis(N-Chlorophenyl)-2,4-dimethylphenylamine Without the use of End-capping Reagent

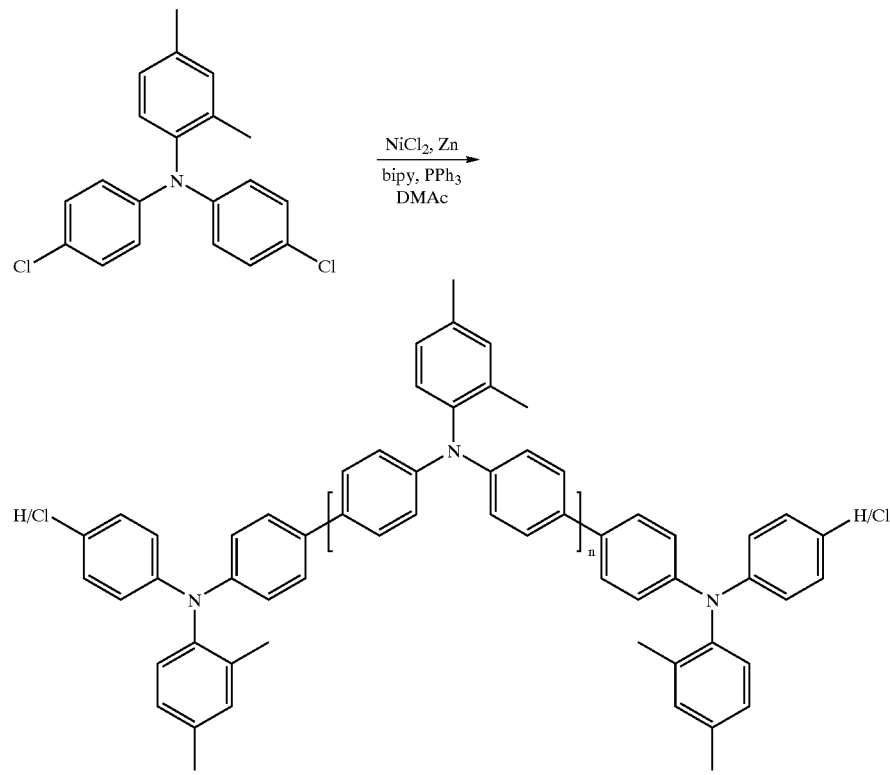

A reaction flask (1 L, 5-neck) equipped with overhead stirrer, condenser, thermometer and nitrogen line was flame dried under nitrogen. Nickel(II) chloride (0.79 g, 6.1 mmol), zinc powder (48.8 g, 747 mmol), 2,2'-dipyridyl (1.44 g, 9.22 mmol), triphenylphosphine (9.52 g, 58.4 mmol) and N,N-dimethylacetamide (anhydrous, 620 mL) were charged to the reaction vessel. The mixture was stirred at room temperature for 30 minutes, then at 80° C. for a further 30 minutes, after which time a deep red/brown solution was observed indicative of catalyst formation. Bis-(4- mmol) was added to the reaction flask, washing in with further N,N-dimethylacetamide (anhydrous, 20 mL). Heating was continued at 80° C. for 5 hours, after which time the reaction was deemed complete, by HPLC analysis. The reaction mixture was allowed to cool to room temperature then poured into toluene (1 L). HCl (conc., 400 mL) was added dropwise to the organic solution, with stirring, to destroy the excess zinc. The resulting mixture effervesced. The organics were separated and washed successively with water (400 mL), sodium hydrogen carbonate (sat. soln., 2×400 mL) and water (400 mL), then dried (MgSO$_4$). The solvents were concentrated under reduced pressure to yield a viscous yellow residue. The residue was dissolved in THF (100 mL) and added dropwise to methanol (500 mL), with stirring. The resultant precipitate was collected by vacuum filtration, then dried under vacuum at 70° C., to yield the title compound (Solid 5A) as a yellow solid (60 g). Mn=3400 daltons; Mw=6900 daltons; m=12.5; and Cl=0.6% w/w.

Part B

Fractionation of '2,4-Dimethyl' Polymer From Polymersiation of bis(N-Chlorophenyl)-2,4-dimethylphenylamine without the Use of Endcapping Reagent Solid 5A isolated in Part A was fractionated to obtain fractions of narrower Mw distribution. Thus, Solid 5A (50.0 g) was dissolved in THF (200 mL) and methanol added dropwise in a process of fractional precipitation. Methanol was added dropwise (see Table 4 for quantities) until the solution maintained a cloudy appearance. After each methanol addition, the solution mixture was allowed to settle then the top liquor layer was decanted off and further methanol added to repeat the process. The bottom cloudy layer was treated with excess methanol (100 mL) to encourage precipitation of the product. Each precipitate was collected by vacuum filtration.

TABLE 4

| Fraction | Total methanol added, (mL) |
| --- | --- |
| 1/1 | 45 |
| 1/2 | 50 (+5) |
| 1/3 | 60 (+10) |
| 1/4 | 70 (+10) |
| 1/5** | 76 (+10) |

**fraction obtained after removal of all solvent under reduced pressure.

Fractions 1/1 and /2 were recombined and fractionated from THF and acetone.

Thus, the fractions were dissolved in THF (200 mL) and the fractionation process repeated as described earlier (see Table 5).

TABLE 5

| Fraction | Total acetone added, (mL) |
| --- | --- |
| 2/1 | 80 |
| 2/2 | 95 (+15) |
| 2/3 | 130 (+35) |
| 2/4** | 130 (+35) |

**fraction obtained after removal of all solvent under reduced pressure.

Of all the fractions obtained, only fractions 1/3, 1/4, 1/5, 2/3 and 2/4 were purified by column chromatography (silica gel). Each fraction was dissolved in a dichloromethane/hexane mixture (100 mL; 1:1), adsorbed onto the column and eluted with a dichloromethane/hexane mixture (2:1, 500 mL; then 3:1, 500 mL). Removal of the solvent under reduced pressure followed by precipitation from THF (50 mL) and methanol (250 mL), as described earlier, yielded the compounds as colourless solids (see Table 6).

TABLE 6

| Fraction | GPC (daltons) | % Cl (w/w) | Weight (g) |
| --- | --- | --- | --- |
| 1/3 | Mw 5700; Mn 3700; m 13.6 | 0.7 | 5.1 |
| 1/4 | Mw 4000; Mn 3000; m 11.0 | 0.7 | 2.5 |
| 1/5 | Mw 1700; Mn 1100; m 4.0 | 0.5 | 4.0 |
| 2/3 | Mw 7200; Mn 5300; m 19.6 | 0.7 | 4.4 |
| 2/4 | Mw 3600; Mn 2200; m 8.1 | 0.7 | 7.5 |

The electrical results for each of the purified fractions are given in Table 7.

TABLE 7

| Fraction | m | $E_{7/8}$ ($\mu Jcm^{-2}$) | $V_r(V)$ | $\mu$ ($cm^2V^{-1}s^{-1}$) @ 160kV/cm |
| --- | --- | --- | --- | --- |
| 1/5 | 4.0 | n/a* | −190 | $1.6 \times 10^{-6}$ |
| 2/4 | 8.1 | 0.42 | −44 | $2.4 \times 10^{-5}$ |
| 1/4 | 11.1 | 0.39 | −34 | $4.1 \times 10^{-5}$ |
| 1/3 | 13.6 | 0.42 | −43 | $8.1 \times 10^{-5}$ |
| 2/3 | 19.6 | 0.45 | −39 | $1.8 \times 10^{-5}$ |

*No $E_{7/8}$ value could be measured for fraction 1/5 since it did not discharge to −100V.

EXAMPLE 6

Isolation of Mw Fractions by Soxhlet Extraction

Part A Preparation of 2,4-dimethyl polymer by polymerising bis(N-chlorophenyl)-2,4-dimethylphenylamine using 1-chloro-3-methylbenzene as the end capping reagent.

A reaction flask fitted with overhead stirrer, condenser, thermometer and nitrogen line was flame dried under nitrogen. Nickel (II) chloride (0.06 g, 0.6 mmol), zinc (5.0 g, 75.0 mmol), 2,2'-dipyridyl (0.14 g, 0.9 mmol), triphenylphosphine (1.6 g, 6.0 mmol) and N,N-dimethylacetamide (90 cm$^3$) were charged to the reaction vessel. The mixture was stirred at room temperature for 30 minutes after which time a deep red/brown solution was observed indicative of catalyst formation. The catalyst was warmed to 74° C. and bis(4-chlorophenyl)-2,4-dimethylphenylamine (8.35 g, 25.0 mmol) and 1-chloro-3-methylbenzene (1.6 g, 12.5 mmol) were added to the reaction mixture. The reaction mixture was maintained at this temperature for 6 hours, after which time further 1-chloro-3-methylbenzene (0.3 g, 20% of original charge) was added. The reaction mixture was maintained at 74° C. for a further 16 hours to ensure the polymer was completely end capped.

The reaction mass was allowed to cool to room temperature and dichloromethane (100 cm$^3$) added and the reaction mixture filtered. The filtrate was washed with HCl (1M, 50 cm$^3$) and dilute NaHCO$_3$ (200 cm$^3$) and dried with MgSO$_4$. The organic extract was concentrated under reduced pressure to a yellow oil. The resulting yellow oil was dissolved in THF (50 cm$^3$) and precipitated into methanol (400 cm$^3$). The precipitate was collected by suction filtration, washing with methanol (3×100 cm$^3$), then dried under vacuum at 70° C. to yield the title product as an off-white powder (5.02 g). Mn=1300 daltons; Mw=2250 daltons; m=4.

Part B Repeat of Part A to yield the title product as an off white powder (4.53 g). Mn=860 daltons; Mw=1500 daltons; m=2.5.

Portions of the isolated crude products (approx 0.5 g, accurately weighed) from Part A or Part B were placed into an extraction thimble and extracted with a specified solvent under reflux for 24 hours. Each residue was dried, weighed and analysed by GPC. (see Tables 8 and 9)

TABLE 8

Analysis of Residues from Part A before & after Solvent Extraction

| Solvent | Bpt (° C.) | Mn | Mw | m | Polydispersity |
|---|---|---|---|---|---|
| Before extraction | N/A | 1300 | 2250 | 4.0 | 1.74 |
| n-Hexane | 69 | 2670 | 2400 | 9.0 | 1.30 |
| Pet ether (60–80° C.) | 60 | 2650 | 2900 | 9.0 | 1.30 |
| Methyl pentane | 62 | 2400 | 2400 | 8.0 | 1.35 |
| n-Octane | 125 | 2200 | 2430 | 7.5 | 1.43 |
| Heptane | 98 | 2000 | 1900 | 7.0 | 1.50 |
| 2-Propanol | 82 | 1800 | 1900 | 6.0 | 1.50 |
| Ethanol | 78 | 1700 | 1500 | 6.0 | 1.60 |
| n-Butanol | 116 | 1700 | 1500 | 5.5 | 1.60 |

TABLE 9

Analysis of Residues from Part B before & after Solvent Extraction

| Solvent | Bpt (° C.) | Mn | Mw | m | Polydispersity |
|---|---|---|---|---|---|
| Before extraction | N/A | 860 | 1500 | 2.5 | 1.75 |
| MTBE | 55 | 1700 | 2490 | 5.5 | 1.48 |
| Acetone | 56 | 1370 | 2040 | 4.0 | 1.49 |
| Methanol | 65 | 940 | 1590 | 3.0 | 1.69 |

Aspects of the Invention may be Summarised as in the Following Clauses

1. A polymeric material comprising at least one repeat unit, the or each (if more than one) repeat unit consisting substantially of a moiety of Formula D:

Formula D

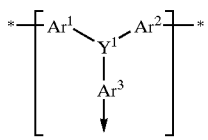

in which:
  $Y^1$ represents, independently if in different repeat units, N, P, S, As and/or Se preferably N;
  $Ar^1$ and $Ar^2$ which may be the same or different, represent, independently if in different repeat units, a multivalent (preferably bivalent) aromatic group (preferably mononuclear but optionally polynuclear) optionally substituted by at least one optionally substituted $C_{1-40}$-carbyl-derived groups and/or at least one other optional substituent, and $Ar^3$ represents, independently if in different repeat units, a mono or multivalent (preferably bivalent) aromatic group (preferably mononuclear but optionally polynuclear) optionally substituted by at least one: optionally substituted $C_{1-40}$-carbyl-derived group and/or at least one other optional substituent, characterised in that, after polymerisation, the polymeric material is treated by a isolation means to isolate a molecular weight fraction which is effective as a charge transport material.

2. A polymeric material as in clause 1, which comprises a substance represented by the following formula:

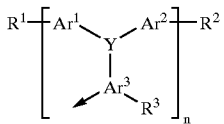

wherein
  $Ar^1$, $Ar^2$, $Ar^3$ and $Y^1$ represent, independently in each case, those group(s) and/or atom(s) as claimed in claim 1;
  n represents an integer from 3 to about 500;
  $R^1$ & $R^2$ represent, independently, a terminal group as described herein;
  $R^3$ represents H or a terminal group which is inert to coupling under polymerisation conditions, such as alkyl or aryl.

3. A polymeric material as in any preceding clause, in which $Ar^1$, $Ar^2$ and $Ar^3$ comprise, independently if in different repeat units, at least one optionally substituted heterocyclic and/or benzenoid ring which comprises an aromatic moiety.

4. A polymeric material as in any preceding clause, in which $Ar^1$, $Ar^2$ and $Ar^3$ comprise, independently if in different repeat units, a bivalent aromatic $C_{6-40}$-hydrocarbyl.

5. A polymeric material as in any preceding clause, which comprises a substance represented by the following formula:

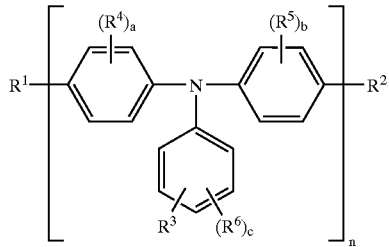

wherein
  $R^1$, $R^2$ & n represent, independently if in different repeat units, those groups or values described herein, $R^3$ only being present when the ring to which it is attached is not itself attached to another repeat unit;
  $R^3$ represents H or a terminal group which is inert to coupling under polymerisation conditions, such as alkyl or aryl;
  a & b represent, independently in each case, 0 or an integer from 1 to 4;
  c represents, independently in each case, 0 or an integer from 1 to d (where d is 6 minus the valence of the aromatic group), preferably 0 to 5;
  n represents an integer from 4 to about 200; and
  $R^4$, $R^5$ & $R^6$ represent, independently in each case, optionally substituted $C_{1-15}$-alkyl and/or at least one optional substituent.

6. A polymeric material as in any preceding clause, in which the terminal group(s) comprise, independently if in different repeat units, at least one optionally substituted $C_{1-40}$-hydrocarbyl group each of which is substantially incapable of undergoing chain extension or cross-linking under the conditions of polymerisation.

7. A polymeric material as in any preceding clause, in which the terminal group(s) comprise, independently if in different repeat units, at least one group selected from $C_{1-30}$-alkyl, $C_{6-36}$-aryl and $C_{7-36}$-aralkyl each of which is substantially incapable of undergoing chain extension or cross-linking under the conditions of polymerisation.

8. A polymeric material which is obtainable and/or obtained by at least one of the processes as in any of clauses 28 to 30.

9. A polymeric material substantially as described herein with reference to the Examples and Tables herein.

10. A composition comprising an inert diluent, optionally substantially electroreprographically inert, and, optionally in a substantially pure form, at least one polymeric material as claimed in any preceding claim.

11. A composition as in clause 10, in which the diluent is selected from at least one of polyamide, polyurethane, polyether, polyester, epoxy resin, polyketone, polycarbonate, polysulfone, vinyl polymer, polystyrene, polyacrylamide, copolymers thereof and mixtures thereof.

12. A composition as in clause 10 or 11, which has a $T_g$ which is within about 50° C. of the $T_g$ of the diluent resin.

13. A composition as in any of clauses 10 to 12, which comprises the at least one polymeric material as claimed in any of claims 1 to 9 in a total amount from about 8% to about 100% by total mass of the composition.

14. A composition as in clause 13, which comprises the at least one polymeric material in a total amount from about 10% to about 75% by total mass of the composition.

15. A composition as in clause 13 or 14, which comprises the at least one polymeric material in a total amount from about 15% to about 50% by total mass of the composition.

16. A composition comprising at least one polymeric material as in any of clauses 10 to 15, the composition being substantially as described herein and/or exhibiting the properties described herein, with reference to any of the Examples and/or Tables herein.

17. A device and/or a component for a device comprising at least one polymeric material as in any of clauses 1 to 9 and/or composition as in any of clauses 10 to 16.

18. A device and/or component as in clause 17, which comprises at least one: electroreprographic device, photo-conductive member for an electroreprographic device, component of an electroreprographic device, and/or consumable for use with and/or in an electroreprographic device.

19. A device, photo-conductor, component and/or consumable as in clause 18, where the device is selected from at least one: photocopier, printer (optionally laser printer), fax machine, scanner and multipurpose devices for copying, faxing and/or scanning.

20. A device, photo-conductor, component and/or consumable as in clause 18 or 19, comprising at least one photosensitive drum and/or photosensitive belt.

21. A device and/or component as in clause 17, which is selected from at least one of the following devices and/or can be used in at least one of the following applications: electroluminescent device, organic light emitting device (OLED); semi-conductor device; photoconductive diode; light emitting diode (LED); metal-semiconductor junction; p-n junction diode; solar cell and/or battery; photovoltaic device; photodetector, optical sensor; phototransducer; bipolar junction transistor (BJT), hetero-junction bipolar transistor and/or other switching transistor; field effect transistor (FET); charge transfer device; laser; p-n-p-n switching device; optically active EL device; thin film transistor (TFT); organic radiation detector; infra-red emitter; tunable microcavity for variable output wavelength; telecommunications device and/or application; optical computing device; optical memory device; general design of detector and/or sensor; chemical detector; any device and/or application which requires polymeric material which exhibits at least one of the following properties: polymeric conduction, polymeric photo-conduction, substantial conjugation over the polymer, polymeric semi-conduction, high carrier mobility, compatibility with binders, improved solubility, high durability and/or high resistivity undoped; and any suitable combinations thereof in the same device and/or component.

22. A method for making a composition as in any of clauses 10 to 16, by mixing at least one polymeric material as claimed in any of claims 1 to 9 with an inert diluent.

23. A method for making a charge transport layer (CTL) comprising coating a substrate with a composition as in any of clauses 10 to 16, and/or at least one polymeric material as in any of clauses 1 to 9 optionally in at least one layer.

24. A method of making a device and/or component as in any of clauses 17 to 21, comprising the step of forming on a substrate at least one charge transport layer (CTL) which comprises a composition as in any of clauses 10 to 16, and/or at least one polymeric material as in any of clauses 1 to 9.

25. Use of a composition as in any of clauses 10 to 16, and/or at least one polymeric material as in any of clauses 1 to 9 as a charge transport material.

26. Use of a composition as in clauses 10 to 16, and/or at least one polymeric material as in any of clauses 1 to 9, in the manufacture of a device and/or component as in any of clauses 17 to 21.

27. Use of a composition as in any of clauses 10 to 16, and/or at least one polymeric material as in any of clauses 1 to 9, in a device and/or component as in any of clauses 17 to 21, for the purpose of transporting charge and/or improving electroreprographic and/or electroluminescent performance.

28. A process for preparing a polymeric material as in any of clauses 1 to 9, comprising after polymerisation an isolation method comprising either sequentially or simultaneously the steps of:
   a) solvent extraction with one or more solvents in which the desired fraction to be isolated has a differential solubility from the unwanted fraction in the polymer mixture.
   b) solid/liquid extraction from a suitable solvent, optionally by Soxhlet extraction and/or slurry extraction;
   c) filtration;
   d) chromatography,
   e) differential separation of the fraction as a gel and/or particulate mass, optionally by differential: flocculation, coagulation, salting out, aggregation, agglomeration and/or precipitation of the fraction from the crude polymer and/or a combination of these methods.
   f) ion exchange, optionally by derivatisation of a suitable salt on the central atom of the polymer repeat unit and then passing the salt through the ion-exchange column.
   g) wiped film evaporation.
   h) melt crystallisation and/or zone refining.
   i) application of ultrasound; and/or
   j) osmotic methods.

29. A process as in clause 28, in which the isolation method comprises solvent extraction with at least one solvent selected from the following each optionally substituted: alkanes, alkyl amines, aromatic compounds, ethers and/or mixtures thereof.

30. A process as in clause 29, in which the solvent is selected from: n-octane, heptane, n-hexane, cyclohexane, methylpentane, n-butanol, n-propanol, 2-propanol, ethanol, methanol, acetone, a mixed alkane petroleum ether with boiling range 60–80° C., methyl tertiary-butyl ether, a high boiling mixed alkane available under the trade name Isopar; and/or mixtures thereof.

What is claimed is:

1. A process, comprising:
    isolating a charge transport material, from a polymer comprising repeat units that are individually represented by the following Formula X

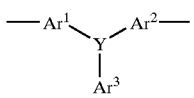

in which
    Y represents P or N;
    $Ar^1$ and $Ar^2$ represent a bivalent aromatic groups;
    $Ar^3$ represents a monovalent aromatic group; and
    the repeat units of Formula X are the same or different.

2. A process for obtaining an improved charge transport material, comprising:
    isolating from a first charge transport material which is a polymer comprising repeating units which are individually represented by the following Formula X

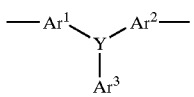

wherein
    Y represents P or N,
    $Ar^1$ & $Ar^2$ represent bivalent aromatic groups;
    $Ar^3$ represent a monovalent aromatic group; and
    the repeat units of Formula X are the same or different,
    the improved charge transport material having a molecular weight fraction with improved charge transport properties.

3. The process according to claim 1 in which $Ar^1$, $Ar^2$ and $Ar^3$ comprise benzenoid rings which are optionally substituted.

4. The process as claimed in claim 1 in which said charge transport material possesses reactive terminal groups permitting further polymerisation to be carried out.

5. The process according to claim 1 which comprises a step of partially precipitating the said charge transport material from a solution of said polymer in a solvent to obtain at least one molecular weight fraction thereof which constitutes at most 50% by weight of the polymer, (including low oligomers), originally present.

6. The process of claim 1 in which said charge transport material is isolated by dissolving the polymer in a solvent, precipitating the least soluble (highest molecular weight) fraction and then recovering a fraction of greater solubility from the remaining solution.

7. The process of claim 1 in which the said charge transport material is separated by dissolving the original polymer in a solvent, precipitating the least soluble fraction leaving a substantial quantity of lower molecular weight material in solution, and either precipitating a further, medium molecular weight fraction from the solution or separating medium molecular weight material from the least soluble fraction.

8. The process of claim 5 in which undesired low molecular weight molecules, which may be present, remain in the solution while an improved charge transport material fraction is recovered.

9. The process of claim 5 in which multiple fractions are recovered by causing precipitation by cooling the solution and collecting successive fractions in the course of cooling or by evaporating the solvent from the solution, and collecting successive fractions.

10. The process of claim 9 in which the fractions are separated by a process which comprises differential precipitation by adding a precipitant to a solution of the polymer and collecting successive fractions at increasing concentrations of the precipitant.

11. The process as claimed in claim 10 in which the precipitant is a liquid miscible with the solvent but in which the polymer is sparingly soluble.

12. The process as claimed in claim 5 in which the solvent is selected from THF, dioxane, dichloroethane, trichloroethane, dichloroethylene, trichloroethylene, toluene and dichlorobenzene.

13. The process as claimed in claim 1 in which a solid polymer is extracted to form a solution of a molecular weight fraction thereof.

14. A charge transport material, comprising:
    units represented by Formula 1

$$AX_mB \qquad \text{Formula 1}$$

wherein
    X represents groups, which may be the same as or differ from other groups, represented by the following formula X:

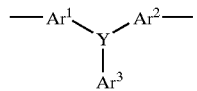

wherein
    Y represents P or N,
    $Ar^1$ & $Ar^2$ represent bivalent aromatic groups, and
    $Ar^3$ represents a monovalent aromatic group;
    A & B are any groups terminating the chain, and
    m is 4 to 50; and
wherein said charge transport material is isolated from a polymer comprising repeat units that are individually represented by the Formula X.

15. A charge transport material produced by the process according to claim 7.

16. A device comprising the charge transport material of claim 14.

17. The charge transport material of claim 14, wherein said groups terminating the chain include hydrogen.

18. The charge transport material of claim 14, wherein said groups terminating the chain include chlorine, bromine or iodine.

19. The charge transport material of claim 14, wherein said groups terminating the chain are leaving groups.

20. The charge transport material of claim 14, wherein said groups terminating the chain are end capping groups.

21. The process of claim 1 which comprises a step of partially precipitating said charge transport material from a solution of said polymer in a solvent to obtain at least one molecular weight fraction thereof which constitutes at most 75% by weight of the polymer, (including low oligomers), originally present.

22. The process of claim 1 which comprises a step of partially precipitating said charge transport material from a solution of said polymer in a solvent to obtain at least one molecular weight fraction thereof which constitutes at most 90% by weight of the polymer, (including low oligomers), originally present.

23. The process of claim 7 wherein at least 10% of lower molecular weight material is left in the solution.

24. The process of claim 7 wherein at least 20% of lower molecular weight material is left in the solution.

25. The process of claim 7 wherein at least 60% of lower molecular weight material is left in the solution.

* * * * *

UNITED STATES PATENT AND TRADEMARK OFFICE
CERTIFICATE OF CORRECTION

PATENT NO. : 6,653,510 B1
DATED : November 25, 2003
INVENTOR(S) : Beverley A. Brown et al.

It is certified that error appears in the above-identified patent and that said Letters Patent is hereby corrected as shown below:

Column 24,
Lines 53 and 54, should read as follows:
-- 15.  A charge transport material produced by the process according to claim 1. --

Signed and Sealed this

Twentieth Day of April, 2004

JON W. DUDAS
*Acting Director of the United States Patent and Trademark Office*